US012768007B2

(12) United States Patent
Nair et al.

(10) Patent No.: US 12,768,007 B2
(45) Date of Patent: Oct. 20, 2026

(54) METHOD FOR RECOVERY OF METALS AND METAL ALLOYS FROM WASTE LITHIUM-ION BATTERIES

(71) Applicants: THE SECRETARY, MINISTRY OF ELECTRONICS AND INFORMATION TECHNOLOGY, GOVT. OF INDIA, New-Delhi (IN); THE DIRECTOR GENERAL, CENTRE FOR MATERIALS FOR ELECTRONICS TECHNOLOGY (C-MET), Pune (IN)

(72) Inventors: Rajesh Kumar Sivasankaran Nair, Pune (IN); Ajay Kaushal, Pune (IN); Amit Barnwal, Pune (IN); Sandip Chatterjee, New-Delhi (IN); Ratheesh Ravendran, Pune (IN)

(73) Assignees: THE SECRETARY, MINISTRY OF ELECTRONICS AND INFORMATION TECHNOLOGY, GOVT. OF INDIA, New-Delhi (IN); THE DIRECTOR GENERAL, CENTRE FOR MATERIALS FOR ELECTRONICS TECHNOLOGY (C-MET), Pune (IN)

( * ) Notice: Subject to any disclaimer, the term of this patent is extended or adjusted under 35 U.S.C. 154(b) by 513 days.

(21) Appl. No.: 18/213,340

(22) Filed: Jun. 23, 2023

(65) Prior Publication Data

US 2024/0002978 A1 Jan. 4, 2024

(30) Foreign Application Priority Data

Jun. 29, 2022 (IN) ............................ 202211037460

(51) Int. Cl.
*C22B 23/02* (2006.01)
*B22F 9/04* (2006.01)
(Continued)

(52) U.S. Cl.
CPC .............. *C22B 23/025* (2013.01); *B22F 9/04* (2013.01); *C22B 5/02* (2013.01); *C22B 15/008* (2013.01);
(Continued)

(58) Field of Classification Search
None
See application file for complete search history.

(56) References Cited

U.S. PATENT DOCUMENTS

2020/0078796 A1* 3/2020 Kochhar ................ C22B 1/005
2021/0395859 A1* 12/2021 Ding ...................... C22B 7/006
(Continued)

FOREIGN PATENT DOCUMENTS

CN 108063295 A * 5/2018

OTHER PUBLICATIONS

English translation of CN 108063295 (originally published May 22, 2018), obtained from PE2E search.*

*Primary Examiner* — David C Mellon
(74) *Attorney, Agent, or Firm* — Rothwell, Figg, Ernst & Manbeck, P.C.

(57) ABSTRACT

The present disclosure relates to a method for the recovery of metals and metal alloys from waste Lithium-ion batteries. The method of the present disclosure uses a smelting process that is energy-efficient, cost-effective and requires comparatively reduced time. Further, the method of the present disclosure has a high metal extraction efficiency. Furthermore, the heat treatment of the residual particulate matter
(Continued)

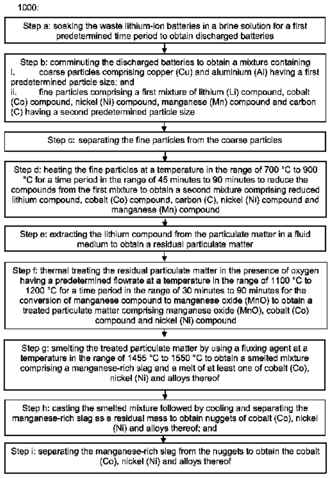

results in the formation of binary Co—Ni alloy and prevents the formation of Co—Ni—Mn ternary alloy during smelting.

6 Claims, 1 Drawing Sheet

(51) Int. Cl.

| | |
|---|---|
| ***C22B 5/02*** | (2006.01) |
| ***C22B 15/00*** | (2006.01) |
| ***C22B 26/12*** | (2006.01) |
| ***H01M 10/54*** | (2006.01) |

(52) U.S. Cl.

CPC ............. *C22B 26/12* (2013.01); *H01M 10/54* (2013.01); *B22F 2301/052* (2013.01); *B22F 2301/10* (2013.01)

(56) References Cited

U.S. PATENT DOCUMENTS

2023/0295770 A1* 9/2023 Abe ........................ C22B 3/065 75/420
2025/0215523 A1* 7/2025 Dougherty ................ C22B 3/44

* cited by examiner

1000:

Step a: soaking the waste lithium-ion batteries in a brine solution for a first predetermined time period to obtain discharged batteries

↓

Step b: comminuting the discharged batteries to obtain a mixture containing i. coarse particles comprising copper (Cu) and aluminium (Al) having a first predetermined particle size; and ii. fine particles comprising a first mixture of lithium (Li) compound, cobalt (Co) compound, nickel (Ni) compound, manganese (Mn) compound and carbon (C) having a second predetermined particle size

↓

Step c: separating the fine particles from the coarse particles

↓

Step d: heating the fine particles at a temperature in the range of 700 °C to 900 °C for a time period in the range of 45 minutes to 90 minutes to reduce the compounds from the first mixture to obtain a second mixture comprising reduced lithium compound, cobalt (Co) compound, carbon (C), nickel (Ni) compound and manganese (Mn) compound

↓

Step e: extracting the lithium compound from the particulate matter in a fluid medium to obtain a residual particulate matter

↓

Step f: thermal treating the residual particulate matter in the presence of oxygen having a predetermined flowrate at a temperature in the range of 1100 °C to 1200 °C for a time period in the range of 30 minutes to 90 minutes for the conversion of manganese compound to manganese oxide (MnO) to obtain a treated particulate matter comprising manganese oxide (MnO), cobalt (Co) compound and nickel (Ni) compound

↓

Step g: smelting the treated particulate matter by using a fluxing agent at a temperature in the range of 1455 °C to 1550 °C to obtain a smelted mixture comprising a manganese-rich slag and a melt of at least one of cobalt (Co), nickel (Ni) and alloys thereof

↓

Step h: casting the smelted mixture followed by cooling and separating the manganese-rich slag as a residual mass to obtain nuggets of cobalt (Co), nickel (Ni) and alloys thereof; and

↓

Step i: separating the manganese-rich slag from the nuggets to obtain the cobalt (Co), nickel (Ni) and alloys thereof

METHOD FOR RECOVERY OF METALS AND METAL ALLOYS FROM WASTE LITHIUM-ION BATTERIES

CROSS REFERENCE TO RELATED APPLICATIONS

This application claims the benefit of priority of Indian Patent Application No. 202211037460, filed Jun. 29, 2022, the contents of which are all incorporated herein by reference in their entirety.

FIELD

The present disclosure relates to a method for recovery of metals and metal alloys from waste lithium-ion batteries. The present disclosure envisages a method for recovery of valuable binary Co—Ni metal alloy by preventing the formation of Co—Ni—Mn ternary alloy.

Definitions

As used in the present disclosure, the following terms are generally intended to have the meaning as set forth below, except to the extent that the context in which they are used indicates otherwise.

Lithium-Ion Battery: The term 'lithium-ion battery' also known as 'Li-ion battery' is a type of rechargeable battery in which lithium ions move from the negative electrode through an electrolyte to the positive electrode during discharge and back when charging. Li-ion batteries use an intercalated lithium compound as the material at the positive electrode and typically graphite at the negative electrode.

Brine Solution: The term 'brine solution' refers to a concentrated solution of salt in water. It can be any solution of a salt in water e.g., potassium chloride brine, sodium chloride brine, and the like.

Casting: The term 'casting' refers to a process of separating metal from slag by pouring of molten metal(s) into a mould where it solidifies into the shape of the mould.

Ingot: The term 'ingot' refers to a mass of metal cast into a shape such as a bar, a plate, or a sheet of a size convenient to store, transport, and work into a semifinished or finished product.

l/h: The unit 'l/h' refers to 'litre/hour', used for measuring the flow rate of a fluid.

Binary alloy: The term 'binary alloy' refers to an alloy containing two component elements.

Ternary alloy: The term 'ternary alloy' refers to an alloy containing three component elements.

BACKGROUND

The background information herein below relates to the present disclosure but is not necessarily prior art.

Millions of Lithium-Ion Batteries (LIBs) are used worldwide each year. Most of these batteries are eventually discarded on completion of their life cycle and find their way to landfill sites. Globally, the primary metals in LIBs are lithium (Li), cobalt (Co), and nickel (Ni) which are not abundantly available whereas the demand for these materials is high. Recovering the metals from LIBs is vital to meet the objective of the circular economy towards reducing greenhouse gas emissions, safeguarding the environment, and meeting the demand for anode and cathode materials such as lithium (Li), cobalt (Co), nickel (Ni) and manganese (Mn) for battery manufacturing.

Hydro-metallurgical processing is used in the majority of LIB recycling/metal recovering methods for the extraction of valuable metals such as Co, Ni, Mn, Li, and the like. Further, pyrometallurgical methods are also used for recovering metals from LIBs. Conventional pyrometallurgical methods for recovering metals use either a gas-fired furnace or an electric resistive type furnace for smelting the feed.

The major drawback of using the pyrometallurgical route in recovering metals from LIBs is the difficulty in extraction of the valuable metal contents as all metal contents smelt almost at the same time and almost at the same temperature to form a mixed metal alloy, and therefore there is a very low recovery of Li metal due to evaporation and infusion of Li content into the slag.

There is, therefore, felt a need to provide a method for the recovery of metals and metal alloys from waste lithium-ion batteries that mitigates the drawbacks mentioned hereinabove or provide at least a useful alternative.

OBJECTS

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide a method for the recovery of metals and metal alloys from waste lithium-ion batteries, in separate distinct fractions.

Still another object of the present disclosure is to provide a method for the recovery of a valuable binary Co—Ni metal alloy from waste Li-ion battery compositions by preventing the formation of Co—Ni—Mn ternary alloy.

Yet another object of the present disclosure is to provide a method for the recovery of metals and metal alloys from waste Li-ion batteries that has a high recovery efficiency.

Still another object of the present disclosure is to provide a method for the recovery of metals and metal alloys from waste Li-ion batteries which requires comparatively less extraction time to extract the metals.

Yet another object of the present disclosure is to provide a simple and cost-effective method with less energy consumption for the recovery of metals and metal alloys from waste Li-ion batteries.

Other objects and advantages of the present disclosure will be more apparent from the following description, which is not intended to limit the scope of the present disclosure.

SUMMARY

The present disclosure relates to a method for the recovery of metals and metal alloys from waste lithium-ion batteries. In the method, waste lithium-ion batteries are soaked in brine solution for a predetermined time period to obtain discharged batteries. The discharged batteries are then comminuted to obtain a mixture containing coarse particles and fine particles, consisting of a first mixture of coarse particles of copper (Cu) and aluminium (Al) having a first predetermined particle size, and a second mixture of the fine particles of lithium (Li) compound, cobalt (Co) compound, nickel (Ni) compound, manganese (Mn) compound and carbon (C) having a second predetermined particle size. The coarse particles are separated from the fine particles by mechanical sieving. The obtained fine particles are heated at a temperature in the range of 700° C. to 900° C. for a time period in the range of 45 minutes to 90 minutes to reduce some of the compounds from the second mixture to obtain a particulate matter comprising reduced lithium compound, typically, lithium carbonate ($Li_2CO_3$), and a third mixture comprising cobalt (Co) compound, nickel (Ni) compound, manganese (Mn) compounds and carbon (C). The reduced lithium compound is extracted from the particulate matter in a fluid medium to obtain a residual particulate matter containing cobalt (Co) compound, nickel (Ni) compound, and manganese (Mn) compound. The residual particulate matter is then thermally treated in the presence of oxygen at a temperature in the range of 1100° C. to 1200° C. for a time period in the range of 30 minutes to 90 minutes for the conversion of manganese compounds to manganese oxide (MnO) to obtain a treated particulate matter comprising manganese oxide (MnO), cobalt (Co) and nickel (Ni). The treated particulate matter is then transferred to a smelting furnace, wherein it is smelted by using a fluxing agent at a temperature in the range of 1455° C. to 1550° C. to obtain a smelted mixture comprising a manganese-rich slag and a melt of cobalt (Co) and nickel (Ni) alloy. Thereafter, the smelted mixture is cast, followed by cooling and separating the manganese-rich slag as a residual mass to obtain nuggets of cobalt (Co) and nickel (Ni) alloy.

In accordance with an embodiment of the present disclosure, the waste lithium-ion batteries are selected from the group consisting of lithium nickel manganese cobalt oxides battery (NMC), lithium nickel cobalt aluminum oxides battery (NCA), lithium cobalt oxide battery (LCO), and lithium manganese oxide battery (LMO).

In accordance with an embodiment of the present disclosure, the second mixture comprises Lithium cobalt oxide ($LiCoO_2$), Lithium manganese oxide ($LiMn_2O_4$), Lithium—Nickel—Manganese—Cobalt-Oxides ($LiNi_1Mn_1Co_1O_2$, $LiNi_{0.8}Mn_{0.1}CO_{0.1}O_2$, $LiNi_{0.33}Mn_{0.33}CO_{0.33}O_2$ $LiNi_{0.5}Mn_{0.3}CO_{0.2}O_2$).

In accordance with an embodiment of the present disclosure, the predetermined time period of soaking in the brine solution is in the range of 4 hours to 14 hours.

In accordance with an embodiment of the present disclosure, the first predetermined size of the particles in the first mixture is in the range of 100 μm to 1000 μm.

In accordance with an embodiment of the present disclosure, the second predetermined size of the particles in the second mixture is in the range of 0.1 μm to 90 μm.

In accordance with an embodiment of the present disclosure, the fluid medium is water.

In accordance with an embodiment of the present disclosure, the lithium carbonate has a purity greater than 99%.

In accordance with an embodiment of the present disclosure, oxygen flow rate, i.e. during the thermal treatment of the residual particulate matter is in the range of 1 l/h to 4 l/h.

In accordance with an embodiment of the present disclosure, the smelting is carried out by using an electric resistive type heating source or an induction heating source.

In accordance with an embodiment of the present disclosure, the smelting is carried out by using an induction heating source.

In accordance with an embodiment of the present disclosure, the alloy of cobalt and nickel (Co—Ni) is recovered in an amount greater than 98% of the cobalt and nickel present in the batteries.

In accordance with an embodiment of the present disclosure, the fluxing agent is at least one selected from the group consisting of silicon dioxide ($SiO_2$), calcium oxide (CaO), glass, borax, sodium carbonate ($NaCO_3$), sodium bicarbonate ($NaHCO_3$), sodium nitrate ($NaNO_3$), and magnesium oxide (MgO).

In accordance with an embodiment of the present disclosure, the manganese-rich slag can further be treated hydrometallurgically to recover the manganese (Mn) content present in the slag with purity equal to or higher than 98%.

BRIEF DESCRIPTION OF THE ACCOMPANYING DRAWING

The present disclosure will now be described with the help of the accompanying drawing, in which:

FIG. 1 illustrates a method for recovery of metals and metal alloys from waste lithium-ion batteries in accordance with the present disclosure.

DETAILED DESCRIPTION

The present disclosure relates to a method for recovery of metals and metal alloys from waste lithium-ion batteries. Particularly, the present disclosure envisages to a method for the recovery of valuable binary Co—Ni metal alloy by preventing the formation of Co—Ni—Mn ternary alloy in a single smelting step.

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Waste LIBs which include active cathode material and anode material contain plenty of valuable metals, such as cobalt (Co), nickel (Ni), manganese (Mn), and lithium (Li). Hydro-metallurgical processing is used in the majority of LIB recycling/metal recovering methods for the extraction of valuable metals such as Co, Ni, Mn, Li, and the like. Further, pyrometallurgical methods are also used for recovering metals from LIBs. Conventional pyrometallurgical methods for recovering metals use either a gas-fired furnace or an electric resistive type furnace for smelting the feed.

The major drawback of using the pyrometallurgical route in recovering metals from LIBs is difficulty in extraction of valuable metal contents as all metal contents smelt at the same time and temperature to form a mixed metal alloy and therefore there is a very low recovery of the Li due to evaporation and infusion of Li content into the slag.

The present disclosure relates to a method for the recovery of metals and metal alloys from waste lithium-ion batteries. Particularly, the present disclosure envisages to a method for the recovery of valuable binary Co—Ni metal alloy by preventing the formation of Co—Ni—Mn ternary alloy in a single smelting step.

The present disclosure provides a method for the recovery of metals from waste lithium-ion batteries. In the method, waste lithium-ion batteries are soaked in a brine solution for a predetermined time period to obtain discharged batteries. The discharged batteries are then comminuted to obtain a mixture containing coarse particles and fine particles. The first mixture of coarse particles comprising copper (Cu) and aluminium (Al) having a first predetermined particle size, and a second mixture of fine particles comprising lithium (Li) compounds, cobalt (Co) compound, nickel (Ni) compound, manganese (Mn) compounds and carbon (C) having a second predetermined particle size. The coarse particles are separated from the fine particles by mechanical sieving to obtain separated fine particles. The obtained fine particles are heated at a temperature in the range of 700° C. to 900° C. for a time period in the range of 45 minutes to 90 minutes to reduce the compounds from the second mixture to obtain a third mixture comprising reduced lithium compound, typically, lithium carbonate ($Li_2CO_3$), and a mixture of cobalt (Co) compound, nickel (Ni) compound and manganese (Mn) compounds. The lithium compound is extracted from the third mixture in a fluid medium to obtain a residual particulate matter containing cobalt (Co) compound, nickel (Ni) compound, and manganese (Mn) compound. The residual particulate matter is then thermally treated in the presence of oxygen having a predetermined oxygen flow rate at a temperature in the range of 1100° C. to 1200° C. for a time period in the range of 30 minutes to 90 minutes for the conversion of manganese (Mn) to manganese oxide (MnO) to obtain a treated particulate matter comprising manganese oxide (MnO), cobalt (Co) and nickel (Ni). The treated particulate matter is then transferred to a smelting furnace, wherein it is smelted by using a fluxing agent at a temperature in the range of 1455° C. to 1550° C. to obtain a smelted mixture comprising a manganese-rich slag and a melt of at least one of cobalt (Co), nickel (Ni) and alloys thereof. Thereafter, the smelted mixture is cast, followed by cooling and separating said manganese-rich slag as a residual mass to obtain nuggets of cobalt (Co) and nickel (Ni) and alloy.

The method is described in detail hereinbelow:

In a first step, waste lithium-ion batteries are soaked in a brine solution for a predetermined time period to obtain discharged batteries. In the brine solution, the residual charges in the batteries are neutralized to obtain discharged batteries. The discharging of the batteries is essential for safe operations, to prevent combustion during further processing of the waste lithium-ion batteries.

In accordance with the embodiments of the present disclosure, the waste batteries are selected from the group consisting of lithium nickel manganese cobalt oxides battery (NMC), lithium nickel cobalt aluminum oxides battery (NCA), lithium cobalt oxide battery (LCO), and lithium manganese oxide battery (LMO). In an exemplary embodiment, the waste battery is lithium nickel cobalt aluminum oxides battery (NCA).

In accordance with the present disclosure, the soaking is done for about 4 hours to 14 hours. In an exemplary embodiment, the waste lithium-ion batteries are discharged by soaking them in a brine solution for 12 hours to discharge the batteries. In another exemplary embodiment, the waste lithium-ion batteries are discharged by dipping them in a brine solution for 5 hours to obtain discharged batteries.

In a second step, the discharged batteries are then comminuted to obtain a mixture containing coarse particles and fine particles. The first mixture of coarse particles comprise copper (Cu) and aluminium (Al) having a first predetermined particle size, and the second mixture of fine particles comprise of lithium (Li) compounds, cobalt (Co) compound, nickel (Ni) compound, manganese (Mn) compounds and carbon (C) having a second predetermined particle size.

In accordance with the embodiments of the present disclosure, the second mixture comprises Lithium cobalt oxide ($LiCoO_2$), Lithium manganese oxide ($LiMn_2O_4$), Lithium—Nickel—Manganese—Cobalt-Oxides ($LiNi_1Mn_1Co_1O_2$, $LiNi_{0.8}Mn_{0.1}Co_{0.1}O_2$, $LiNi_{0.33}Mn_{0.33}Co_{0.33}O_2$ and $LiNi_{0.5}Mn_{0.3}Co_{0.2}O_2$). In accordance with the embodiments of the present disclosure, the mechanical treatment is done by a hammer mill, shredder, pulveriser, disc mill, cutting mill and ball mill. In an exemplary embodiment, the mechanical treatment is done by a hammer mill. In another exemplary embodiment, the mechanical treatment is done by the shredder and hammer mill.

In accordance with another embodiment of the present disclosure, the comminution is performed in two steps, wherein in the first step, the discharged batteries are shredded using a shredder that cuts the batteries into small pieces to obtain shredded particles. The shredded particles are then milled to obtain a mixture comprising coarse particles and fine particles.

In a second step, the fine particles are separated from coarse particles by mechanical sieving to obtain separated fine particles.

In accordance with the embodiments of the present disclosure, the size of the coarse particles is greater than 100 μm. In another embodiment, the particle size of the coarse particles is in the range of ~100 μm to 1000 μm.

In accordance with the embodiments of the present disclosure, the particle size of the fine particles is less than 100 μm and particularly is in the range of 0.1 μm to 90 μm.

In an exemplary embodiment, the screen size used for mechanical sieving is 100 μm.

In a fourth step, the fine particles obtained after sieving are heated at a temperature in the range of 700° C. to 900° C. for a time period in the range of 45 minutes to 90 minutes to reduce the compounds from the second mixture to obtain a third mixture comprising a second reduced lithium compound, cobalt (Co) compound, nickel (Ni) compound and manganese (Mn) compound.

In accordance with the present disclosure, the lithium compounds in the mixture obtained after sieving is reduced by a carbothermal treatment. Carbon present in the anode components of the battery combines with lithium and oxygen during the carbothermal treatment to form lithium carbonate.

In an exemplary embodiment, the obtained fine particles in the second mixture are heated at a temperature of 850° C. In another exemplary embodiment, the obtained fine particles are heated at a temperature of 750° C.

In an exemplary embodiment, the obtained fine particles are heated for 90 minutes.

In a fifth step, the lithium carbonate is extracted from the third mixture in a fluid medium to obtain residual particulate matter containing cobalt (Co) compound, nickel (Ni) compound, and manganese (Mn) compound. In accordance with the embodiments of the present disclosure, the fluid medium is water.

In accordance with the embodiments of the present disclosure, this mixture of lithium carbonate solution and particulate matter is filtered to separate lithium carbonate solution and leave a residue of that particulate matter. In an embodiment of the present disclosure, water is added to the third mixture, followed by mixing to obtain a solution comprising lithium carbonate ($Li_2CO_3$) and the residual particulate matter which is separated by filtration.

In an embodiment of the present disclosure, after carbothermal treatment, the lithium carbonate from the fluid medium is crystallized to obtain a crystallized lithium carbonate ($Li_2CO_3$).

Thereafter, the separated residual particulate matter is dried in an oven at a temperature in the range of 50° C. to 80° C. to obtain a dried residual particulate matter.

In accordance with the embodiments of the present disclosure, the lithium carbonate crystals have a purity greater than 99%.

In a sixth step, the dried residual particulate matter is then thermaly treated in the presence of oxygen having a predetermined oxygen flow rate at predetermined temperature in the range of 1100° C. to 1200° C. for a time period in the range of 30 minutes to 90 minutes for the conversion of manganese (Mn) to manganese oxide (MnO) to obtain a treated particulate matter comprising manganese oxide (MnO), cobalt (Co) and nickel (Ni).

In accordance with an embodiment of the present disclosure, the predetermined oxygen flow rate during the thermal treatment is in the range of 1 to 4 l/h.

In an exemplary embodiment, the residual particulate matter is thermally treated at 1200° C. In another exemplary embodiment, the residual mass particulate matter is thermally treated at 1100° C.

In an exemplary embodiment, the residual mass particulate matter is thermally treated for 60 minutes.

The thermal treatment in the presence of oxygen oxidizes the manganese (Mn) in the residual particulate matter to its oxide. The melting point of manganese (II) oxide (MnO) is much higher (1945° C.) than the melting point of cobalt (1495° C.) and nickel (1455° C.). Therefore, thermodynamically it is favourable that both cobalt and nickel contents melt during smelting operations at a temperature around 1500° C., wherein MnO remains unmelt, thereby preventing the formation of the ternary Co—Mn—Ni alloy during smelting.

In a seventh step, the treated particulate matter is smelted by using a fluxing agent at a temperature in the range of 1455° C. to 1550° C. to obtain a smelted mixture comprising a manganese-rich slag and a melt of at least one of cobalt (Co), nickel (Ni) and alloys thereof.

In an exemplary embodiment, the treated particulate matter is smelted at 1500° C. to obtain a smelted mixture comprising a melt of cobalt-nickel (Co—Ni) metal and a manganese-rich slag.

In accordance with the embodiments of the present disclosure, the treated particulate matter is smelted at a temperature higher than 1455° C., but below 1495° C. to obtain and separate a nickel (Ni) melt. Thereafter, the temperature is raised to 1550° C. to obtain and separate cobalt (Co) melt.

In accordance with an embodiment of the present disclosure, the smelting is performed for a time period in the range of 10 minutes to 30 minutes. In an exemplary embodiment, the smelting is performed for 20 minutes.

In accordance with an embodiment of the present disclosure, the fluxing agent is at least one selected from the group consisting of silicon dioxide ($SiO_2$), calcium oxide (CaO), glass, borax, sodium carbonate ($NaCO_3$), sodium bicarbonate ($NaHCO_3$), sodium nitrate ($NaNO_3$), and magnesium oxide (MgO). In an exemplary embodiment, the fluxing agent is a mixture of silicon dioxide ($SiO_2$), calcium oxide (CaO), borax and magnesium oxide (MgO).

In an eighth step, the smelted mixture is cast and cooled to separate the manganese-rich slag as a residual mass to obtain at least one of cobalt (Co), nickel (Ni) and alloy or cobalt-nickel binary alloy.

In accordance with an embodiment of the present disclosure, the alloy of cobalt (Co) and nickel (Ni) is recovered in an amount greater than 98% of its content in the fine particles.

In an embodiment, the smelted mixture is subjected to casting followed by cooling to obtain an alloy of cobalt-nickel (Co—Ni) and a separated manganese-rich slag as a residual mass.

In accordance with an embodiment of the present disclosure, the smelted mixture is subjected to casting followed by naturally cooling in an ambient atmosphere to obtain an alloy of cobalt—nickel (Co—Ni) and a separated manganese-rich slag as a residual mass.

The smelted mixture comprises a melt of metals along with the residual mass. Since the metals have high density, therefore when cast in a conical shape crucible, the metal melts and settles down in the crucible. The lower density slag which is Mn-rich slag as the residual mass settles on the upper section of the crucible. When the mixture is allowed to cool down naturally in the crucible, the high-density metal fractions are separated from the lower-density slag fractions using a simple hammer.

In accordance with the present disclosure, particularly, the lithium (Li) extraction followed by the thermal treatment of material at high temperature leads to the formation of Co—Ni alloy as metal ingot in smelting with Mn content remaining in the slag.

The binary Co—Ni alloy finds potential application in microelectromechanical systems and ferromagnetic magneto resistors due to their good soft magnetic behaviour. Binary Co—Ni alloy can also be used as a master alloy to boost the strength and magnetic properties of high-strength superalloys. Both resistive heating and induction heating are applied for the smelting of residual mass for which the induction smelting route is found effective with high metal recovery.

In accordance with an embodiment of the present disclosure, the smelting includes induction smelting.

In accordance with an embodiment of the present disclosure, the applied induction smelting route is extremely fast, energy-efficient, and easily scalable.

The induction smelting route disclosed in the present disclosure is found to yield a high metal alloy with minimal metal losses in the slag. Smelting of the treated particulate matter is carried out in an energy-efficient manner by using an induction smelting furnace which reduces the total processing cost compared to other smelting routes. In an embodiment, the smelting of 250 g of treated black mass is completed at a time in the range of 15 minutes to 30 minutes by using the induction smelting route. The method of the present disclosure provides the recovery of Co—Ni metal alloy in a single-step induction smelting route. In the case of a resistive heating furnace, an average of 240 minutes is taken for a furnace to reach 1500° C. with an additional 90 minutes to 120 minutes for complete smelting of 250 g of treated black mass.

The smelting of the particulate matter is carried out in a well-controlled manner by using an induction heating source followed by successful casting. The high-voltage primary coil in induction furnaces produces frequencies of about 50 to 10000 hertz per second which allows the charge to heat up quickly, providing higher thermal efficiency. The increased efficiency in the smelting process by using an induction source leads to higher recovery.

The foregoing description of the embodiments has been provided for purposes of illustration and is not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment 1: A method for recovery of metals and metals alloys (binary Co—Ni metal alloy) from waste Li-ion batteries by using single-step induction smelting, in accordance with the present disclosure:

100 kg of waste Lithium-Ion Batteries (LIBs) were collected and discharged by soaking in 200 litres of a brine solution for 5 hours. Thus, the batteries were discharged which assured the safe destruction of the batteries. The discharged waste batteries were shredded by using a shredder and subsequent hammer milling to obtain a mixture of 50 kg with agglomerates of different particle size distributions having sizes lower than 500 μm. The mixture was screened through a sieve having a screen size of 100 μm to obtain coarse particles of aluminum (Al) and copper (Cu) and fine particles. The mixture of aluminum (Al) and copper (Cu) had a particle size higher than 100 μm. The fine particles were reduced by a carbo-thermal treatment at 750° C. for 90 minutes in oxygen with flow rate of 2 l/h to obtain a particulate matter comprising lithium carbonate ($Li_2CO_3$), Cobalt (Co) compound, Nickel (Ni) compound and Manganese (Mn) compound. The thermal reduction step reduced the Li contents to their carbonates due to the presence of carbon in the black mass from the anode component of batteries. The reduced black mass was mixed with 500 litres of water to obtain a third mixture comprising lithium carbonate ($Li_2CO_3$) and the residual particulate matter. The second mixture was filtered to obtain a solution comprising lithium carbonate ($Li_2CO_3$) and a separated residual mass. The dissolved lithium carbonate ($Li_2CO_3$) was extracted from the solution by crystallization to obtain crystallized lithium carbonate ($Li_2CO_3$).

The crystallized lithium carbonate ($Li_2CO_3$) had a purity higher than 99%.

The analysis of the recovered metal contents was carried out by using inductively coupled plasma optical emission spectrometry (ICP-OES). The separated residual mass was dried in an oven to obtain a dried residual particulate matter. The dried residual particulate matter was heated in the presence of oxygen at 1200° C. for 1 hour to obtain treated particulate matter. The heat treatment in the presence of oxygen at this stage oxidizes the Mn contents to its oxides, thereby preventing the formation of a ternary alloy during smelting. The treated black mass was smelted at 1500° C. for 20 minutes to obtain a smelted mixture comprising a melt of cobalt-nickel (Co—Ni) metals and a manganese-rich slag. The smelted mixture was subjected to casting and naturally cooling to 30° C. (room temperature) to obtain an alloy of cobalt-nickel (Co—Ni) and a separated manganese-rich slag as a residual mass.

Smelting was carried out in an energy-efficient manner by using an induction smelting furnace which reduces the total processing cost when compared to electric resistive type heating. A complete smelting of 250 g batch of the treated particulate matter was carried out within 20 minutes by using the induction heating source. It was observed that smelting by using the induction melting furnace was extremely fast and energy-efficient when compared to smelting by using a resistive heating source. Thus, the method of the present disclosure provides a fast and efficient smelting process to recover Co—Ni metal alloy from the fine particles and a mixture of silicon dioxide ($SiO_2$), calcium oxide (CaO), borax and magnesium oxide (MgO) (a combination of fluxing agent).

A total of 10 smelting experiments with 250 g per batch of residual mass, with and without thermal treatment were carried out in continuous successive mode by using an induction heating furnace having a crucible size of 1 litre capacity.

Table 1 shows the ICP-OES results of elemental contents present in batteries' fine particles at different powder processing steps and in metal alloy ingot received after induction smelting of the treated particulate matter.

TABLE 1

ICP-OES results of different elemental contents present in batteries' fine particles (black mass) at different powder processing steps and in metal alloy ingot received after induction smelting. The ingot is a mass of metal cast into a size and shape such as a bar, a plate, or a sheet convenient to store, transport, and work into a semifinished or finished product.

Feed and product composition

| | Weight (g) | Co (wt. %) | Cu (wt. %) | Fe (wt. %) | Li (wt. %) | Mn (wt. %) | Ni (wt. %) | Al (wt. %) | $SiO_2$ (wt. %) | CaO (wt. %) | Others (wt. %) |
|---|---|---|---|---|---|---|---|---|---|---|---|
| Milled mixture | | 14.75 | 10.02 | 0.19 | 4.84 | 8.52 | 1.73 | 6.97 | | | |
| Fine particles | 300 | 26.5 | 0.14 | 0.22 | 4.73 | 12.1 | 2.37 | 0.11 | — | — | 53.83 |

TABLE 1-continued

ICP-OES results of different elemental contents present in batteries' fine particles (black mass) at different powder processing steps and in metal alloy ingot received after induction smelting. The ingot is a mass of metal cast into a size and shape such as a bar, a plate, or a sheet convenient to store, transport, and work into a semifinished or finished product. Feed and product composition

| | Weight (g) | Co (wt. %) | Cu (wt. %) | Fe (wt. %) | Li (wt. %) | Mn (wt. %) | Ni (wt. %) | Al (wt. %) | $SiO_2$ (wt. %) | CaO (wt. %) | Others (wt. %) |
|---|---|---|---|---|---|---|---|---|---|---|---|
| Reduced particulate matter | 272 | 45.21 | 0.87 | 0.41 | 6.17 | 12.8 | 4.34 | 0.79 | — | — | 29.41 |
| Treated particulate matter | 250 | 49.50 | 0.98 | 0.38 | 0.41 | 13.7 | 5.85 | 0.81 | | | 28.83 |
| Flux | 42 | | | | | | | | 6 | 12 | 24 |
| Metal ingot (Co—Ni alloy) | 152.8 | 80.23 | 0.16 | 0.31 | 0.05 | 0.42 | 9.41 | 0.05 | | | |
| Slag | 44.6 | 0.72 | 0.07 | 0.10 | 0.70 | 25.56 | 0.06 | 0.24 | — | — | 72.55 |

It is evident from Table 1 that, a binary cobalt-nickel (Co—Ni) metal alloy with 80.23% of Co and 9.41% of Ni metal contents was formed after induction smelting of treated black mass. However, a cobalt-manganese-nickel (Co—Mn—Ni) ternary alloy with 73.23% of Co, 10.97% of Mn and 4.31% of Ni metal contents was obtained from smelting of residual black mass as evident from ICP-OES analysis provided in Table 2.

TABLE 2

ICP-OES results of elemental contents present in residual particulate matter and in metal alloy ingot received after induction smelting:

| | Weight (g) | Co (wt. %) | Cu (wt. %) | Fe (wt. %) | Li (wt. %) | Mn (wt. %) | Ni (wt. %) | Al (wt. %) | SiO2 (wt. %) | CaO (wt. %) | Others (wt. %) |
|---|---|---|---|---|---|---|---|---|---|---|---|
| Residual particulate matter | 250 | 47.23 | 0.91 | 0.40 | 0.52 | 13.5 | 5.69 | 0.77 | | | |
| Flux | 42 | | | | | | | | 6 | 12 | 24 |
| Metal ingot (Co—Mn—Ni alloy) | 155 | 73.23 | 1.19 | 0.25 | 0.01 | 10.97 | 4.31 | 0.06 | | | |
| Slag | 38 | 0.21 | 0.01 | 0.02 | 0.40 | 2.95 | ND | 0.90 | | | |

The effectiveness of the smelting was observed by comparing the results obtained in smelting using the resistive heating furnace and induction heating furnace.

The same optimized composition of 250 g treated particulate matter per batch was also smelted in a continuous successive mode for a total of 10 experiments by using the resistive heating furnace. The claimed results are consistent and reproducible. The average energy used for the complete smelting of 250 g batch of experiments in an induction furnace was found to be 7 kWh (calculated for continuous 10 batches of experiments), which is much lower than the average energy utilized in smelting per batch using resistive heating furnace calculated as ~25 kWh (calculated for continuous 10 batches of experiments). The process is easily scalable by increasing crucible volume and optimizing the power of the induction source.

A high metal content of Co and Ni in the final metal ingot was received which was calculated as 99.06% of Co, 98.31% of Ni metals recovery from the starting feed (black mass) composition as shown in Table 3.

Table 3 shows the Co—Ni recovery from LIB fine particles to Co—Ni metal alloy obtained after induction smelting:

| Amount of residual mass per batch | Number of experiments | The average time taken for complete smelting | Co Recovery | Ni Recovery | Average energy used |
|---|---|---|---|---|---|
| 250 g LIB + 14% flux | 10 | 20 minutes per batch | 99.06% | 98.31% | ~7 kWh per batch |

It is shown in Table 3 that the complete smelting of LIB fine particles after processing was successfully carried out in 20 minutes by using an induction melting furnace. In addition, more than 99% of Co and more than 98% Ni metal content were recovered from batteries' black mass in the form of binary Co—Ni alloy.

Comparative Experiment 2: A method for the recovery of binary Co—Ni metal alloy from waste batteries by using electric resistive heating furnace:

The same experimental procedure was followed as described in Experiment 1 except, the use of electric resistive heating furnace instead of an induction heating furnace and smelting time was 120 minutes instead of 20 minutes.

Total of 10 smelting experiments were carried out in continuous mode for the same feed composition and the results are provided herein below Table 4.

TABLE 4

Analysis of the various feed (fine particles at different processing steps) and product composition obtained after the smelting using an electric resistive heating furnace: Feed and product composition

| | Weight (g) | Co (wt. %) | Cu (wt %) | Fe (wt. %) | Li (wt. % | Mn (wt. %) | Ni (wt. %) | Al (wt. %) | $SiO_2$ (wt %) | CaO (wt %) | Others (wt %) |
|---|---|---|---|---|---|---|---|---|---|---|---|
| Milled mixture | | 14.75 | 10.02 | 0.19 | 4.84 | 8.52 | 1.73 | 6.97 | | | |
| Fine particles | 300 | 26.5 | 0.14 | 0.22 | 4.73 | 12.1 | 2.37 | 0.11 | — | — | 53.83 |
| Reduced particulate matter | 272 | 45.21 | 0.87 | 0.41 | 6.17 | 12.8 | 4.34 | 0.79 | — | — | 29.41 |
| Treated particulate matter | 250 | 49.50 | 0.98 | 0.38 | 0.41 | 13.7 | 5.85 | 0.81 | | | 28.83 |
| Flux | 42 | | | | | | | | 6 | 12 | 24 |
| Metal ingot (Co—Ni alloy) | 140 | 78.03 | 1.36 | 0.11 | 0.11 | 0.46 | 8.80 | 0.12 | | | |
| Slag | 66 | 0.31 | 0.06 | 0.45 | 1.35 | 21.5 | 0.3 | 0.37 | — | — | 75.66 |

Table 4 shows the ICP-OES results of different elemental contents present in LIB black mass feed analyzed at different processing steps along with elemental content present in the metal alloy ingot received after smelting using a resistive heating furnace. The results are comparable to that of obtained by using an induction heating furnace revealing the fact that the powder processing including Li content extraction prior to smelting as well as thermal treatment of powder are the important steps in achieving the valuable Co—Ni binary alloy wherein Mn content remained in the slag. In addition, the step of smelting in induction heating furnace was found to be fast and cost-effective when compared to smelting using the resistive heating source. The energy consumed for smelting 250 g of batteries black mass by using the induction heating furnace was found to be very less (7 kWh per batch) as compared to the energy used in the resistive heating source (25 kWh per batch) as shown in Table 5.

TABLE 5

Recovery of Co—Ni from LIB black mass obtained after electric resistive smelting.

| Amount of residual mass per batch | Number of experiments | Average time taken for complete smelting | Co Recovery | Ni Recovery | Average energy used |
|---|---|---|---|---|---|
| 250 g LIB + 14% flux | 10 | 240 minutes per batch | 88.27% | 84.24% | ~25 kWh per batch |

From Table 5, it is evident that a higher amount of energy (25 kWh) was used in electric resistive smelting as compared to the low energy (7 kWh) being used in induction smelting for a single batch of 250 g of fine particles (refer Table 5 along with Table 3). The results obtained reveal that the smelting of LIBs' fine particles by using the induction melting furnace is extremely fast and energy-efficient when compared to the smelting using the resistive heating source.

TECHNICAL ADVANCEMENTS

The present disclosure described hereinabove has several technical advantages including, but not limited to, the realization of a method for the recovery of metals/metal alloys from Lithium-ion waste batteries that:

is energy-efficient and time effective;

has a high metal extraction efficiency;

prevents the formation of Co—Ni—Mn ternary alloy; and is cost-effective.

Throughout this specification the word "comprise", or variations such as "comprises" or "comprising, will be understood to imply the inclusion of a stated element, integer or step," or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The economy significance details requirement may be called during the examination. Only after filing of this Patent application, the applicant can work publically related to present disclosure product/process/method. The applicant will disclose all the details related to the economic significance contribution after the protection of invention.

The invention claimed is:

1. A method for recovering metals and metal alloys from waste lithium-ion batteries, said method comprising the following steps:

a. extracting copper (Cu) and aluminium (Al) from said waste lithium-ion batteries to obtain a black mass, wherein said extracting comprises:
   i. dipping said waste lithium-ion batteries in a brine solution for 4 to 14 hours to obtain discharged batteries;
   ii. mechanically treating said discharged batteries using at least one of a hammer mill, shredder, pulveriser, disc mill, cutting mill, or ball mill to obtain a milled mixture containing (A) particles comprising copper (Cu) and aluminium (Al) having a particle size of 100 μm to 1000 μm; and (B) a black mass fraction comprising compounds of lithium (Li), cobalt (Co), nickel (Ni), manganese (Mn), and carbon (C) having a particle size of 0.1 μm to 90 μm; and
   iii. separating coarse particles from fine particles by mechanical sieving using a screen size of 50 μm to 500 μm, to obtain the black mass as the separated fine fraction and to obtain separated Cu and Al particles as the coarse fraction;

b. extracting lithium contents from said black mass to obtain a residual black mass, wherein said lithium extracting comprises:
   i. heating said black mass at a temperature in the range of 700° C. to 900° C. for a time period in the range of 45 minutes to 90 minutes to reduce said compounds from said black mass to obtain a mixture comprising lithium carbonate, cobalt (Co) compound, nickel (Ni) compound and manganese (Mn) compound; and
   ii. dissolving the lithium carbonate formed in step b.i in water and filtering to obtain a filtrate containing the dissolved lithium carbonate and an insoluble residue comprising the residual black mass, and crystallizing lithium carbonate from the filtrate;

c. thermally processing the residual black mass in the presence of oxygen at a flow rate of 1 l/h to 4 l/h and at 1100° C. to 1200° C. for 30 to 90 minutes to convert manganese compound(s) to manganese oxide (MnO), thereby obtaining a treated black mass comprising MnO and compounds of Co and Ni;

d. smelting the treated black mass with a fluxing agent at 1455° C. to 1550° C. for 10 to 30 minutes to obtain a smelted mixture comprising a melt of cobalt-nickel (Co—Ni) metal and a manganese-rich slag; and e. casting the smelted mixture and cooling to obtain a solidified Co—Ni metal and a separated manganese-rich slag, and separating the manganese-rich slag from the solidified Co—Ni metal to obtain a cobalt-nickel (Co—Ni) alloy.

2. The method as claimed in claim 1, wherein the waste lithium-ion batteries comprise one or more of: lithium nickel manganese cobalt oxide (NMC), lithium nickel cobalt aluminum oxide (NCA), lithium cobalt oxide (LCO), and lithium manganese oxide (LMO).

3. The method as claimed in claim 1, wherein said crystallized lithium carbonate has a purity of more than 99%.

4. The method as claimed in claim 1, wherein smelting is carried out using an electric resistive heating source or an induction heating source; wherein smelting with an induction heating source requires comparatively less time and energy for smelting than smelting with an electric resistive heating source.

5. The method as claimed in claim 1, wherein said alloy of cobalt (Co) and nickel (Ni) is recovered in an amount greater than 98% of the cobalt and nickel present in the batteries.

6. The method as claimed in claim 1, wherein the fluxing agent comprises at least one of silicon dioxide ($SiO_2$), calcium oxide (CaO), glass, borax, sodium carbonate ($Na_2CO_3$), sodium bicarbonate ($NaHCO_3$), sodium nitrate ($NaNO_3$), and magnesium oxide (MgO), and wherein the manganese-rich slag is treated by a hydrometallurgical process to recover manganese (Mn) with a purity equal to or higher than 98%.

* * * * *